United States Patent [19]

Cheselka et al.

[11] Patent Number: 5,754,804
[45] Date of Patent: May 19, 1998

[54] METHOD AND SYSTEM FOR MANAGING SYSTEM BUS COMMUNICATIONS IN A DATA PROCESSING SYSTEM

[75] Inventors: Harry Cheselka; Steven Wade Hunter, both of Raleigh; Charles Steven Lingafelt, Durham; James Gregory Mulkey; John Wagner Yarbrough, both of Raleigh, all of N.C.

[73] Assignee: International Business Machines Corporation, Armonk, N.Y.

[21] Appl. No.: 594,056

[22] Filed: Jan. 30, 1996

[51] Int. Cl.$^6$ .................................................. G06F 13/00
[52] U.S. Cl. ........................ 395/306; 395/309; 395/299
[58] Field of Search ................................ 395/728, 730, 395/299, 305, 308, 200.03, 280, 284, 306

[56] References Cited

U.S. PATENT DOCUMENTS

| | | | |
|---|---|---|---|
| 4,523,272 | 6/1985 | Fukunaga et al. | 364/200 |
| 4,672,536 | 6/1987 | Giroir et al. | 364/200 |
| 5,237,567 | 8/1993 | Nay et al. | 370/85.1 |
| 5,404,462 | 4/1995 | Datwyler et al. | 395/325 |
| 5,461,723 | 10/1995 | Shah et al. | 395/293 |
| 5,483,642 | 1/1996 | Okazawa et al. | 395/306 |
| 5,485,576 | 1/1996 | Fee et al. | 395/185.09 |

*Primary Examiner*—Jack B. Harvey
*Assistant Examiner*—Jigar Pancholi
*Attorney, Agent, or Firm*—Stephen T. Keohane; John J. Timar

[57] ABSTRACT

In a data processing system, a first system processor is coupled to a first system bus. The first system processor includes a first bus controller. A second system processor having a second bus controller is coupled to a second system bus. The first bus controller is then coupled to a management bus, and the second bus controller is coupled to the same management bus. Thereafter, at least one feature device is coupled to the first system bus, the second system bus, and the management bus. The feature device is also configured to communicate system processor communications with the first system processor via the first system bus. Next, a problem that affects system processor communications over the first system bus between the feature device and the first system processor is detected. In response to detecting such a communications problem, a command is sent to the feature device via the management bus. In response to receiving the command on the management bus, the feature device is configured to communicate system processor communications with the second system processor via the second system bus, wherein the feature device continues to operate in the data processing system as a result of communicating system processor communications with the second system processor via the second system bus in the presence of a problem that affects system processor communications over the first system bus. A second management bus may be coupled to the first bus controller, the second bus controller, and the feature device for providing a redundant management bus.

20 Claims, 6 Drawing Sheets

METHOD AND SYSTEM FOR MANAGING SYSTEM BUS COMMUNICATIONS IN A DATA PROCESSING SYSTEM

BACKGROUND OF THE INVENTION

1. Technical Field

The present invention relates in general to an improved data processing system, and in particular to an improved method and system for increasing the reliability of the data processing system. Still more particularly, the present invention relates to an improved method and system for managing system bus communication between a system processor and a peripheral device in the processing system.

2. Description of the Related Art

In a data processing system, a "bus control" function typically contains facilities for managing the overall operation of a system bus. For example, such bus control functions may include arbitration, reset and initialization, and error detection and management. Bus devices that are connected to the system bus may be designed to perform functions such as a "bus master," "bus slave," or a combination of both bus master and bus slave. The bus master is able to set up a data transfer on the bus, while the bus slave must wait for and respond to commands from another device before data can be transferred on the bus. In some data processing systems, such bus control and bus device functions are combined within a "system processor" which attaches to the system bus. Such a system processor unit is typically part of the base function of the data processing system with remaining bus devices added to the system and connected to the system bus to provide optional or "featured" functions within the data processing system. Both the system processor and the feature bus devices may be implemented as plugable units so that they can be changed or upgraded according to the requirements of the total data processing system. Such a prior art data processing system may be represented as shown in FIG. 1.

In some data processing systems, feature bus devices and system processors may be implemented as cards which may be plugged into a backplane or motherboard. The system bus may comprise interconnecting conductors or wires and connectors on such a backplane. Communication of data, addresses and other control signals on the system bus may be referred to collectively as "system processor communications."

Frequently, data processing systems are used to support mission critical operations, and therefore must be available to perform their functions on a highly consistent basis. Such a high availability requirement exists for data processing systems that function as bridges, routers, gateways, concentrators, switches, hubs, communication controllers, servers, and the like. Many of these data processing systems are based on a shared system bus architecture, which is widely available for a relatively low cost. In such a shared system bus data processing system, the transmission wires that comprise the system bus are shared by "system processor" cards and "feature device" cards that are plugged into or coupled to the system bus. This makes the data processing system that uses a shared system bus media susceptible to single points of failure. For example, failure of interconnecting wires, bus transceivers, bus-protocol state-machines, bus-control mechanisms (e.g., arbiters, etc. ...) can lead an interruption of system processor communications which can cause a total data processing system failure. Therefore, there is a need in the prior art for a method and system for managing system bus communications that is reliable, fault tolerant, low cost and versatile.

SUMMARY OF THE INVENTION

It is therefore one object of the present invention to provide an improved data processing system.

It is another object of the present invention to provide an improved method and system for increasing the reliability of a data processing system.

It is yet another object of the present invention to provide an improved method and system for managing system bus communication between a system processor and a feature bus device connected to the system bus.

The foregoing objects are achieved as is now described. In a data processing system, a first system processor is coupled to a first system bus. The first system processor includes a first bus controller. A second system processor having a second bus controller is coupled to a second system bus. The first bus controller is then coupled to a management bus, and the second bus controller is coupled to the same management bus. Thereafter, at least one feature device is coupled to the first system bus, the second system bus, and the management bus. The feature device is also configured to communicate system processor communications with the first system processor via the first system bus. Next, a problem that affects system processor communications over the first system bus between the feature device and the first system processor is detected. In response to detecting such a communications problem, a command is sent to the feature device via the management bus. In response to receiving the command on the management bus, the feature device is configured to communicate system processor communications with the second system processor via the second system bus, wherein the feature device continues to operate in the data processing system as a result of communicating system processor communications with the second system processor via the second system bus in the presence of a problem that affects system processor communications over the first system bus. A second management bus may be coupled to the first bus controller, the second bus controller, and the feature device for providing a redundant management bus.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings wherein:

DETAILED DESCRIPTION OF THE PREFERRED EMBODIMENT

Figure 1:
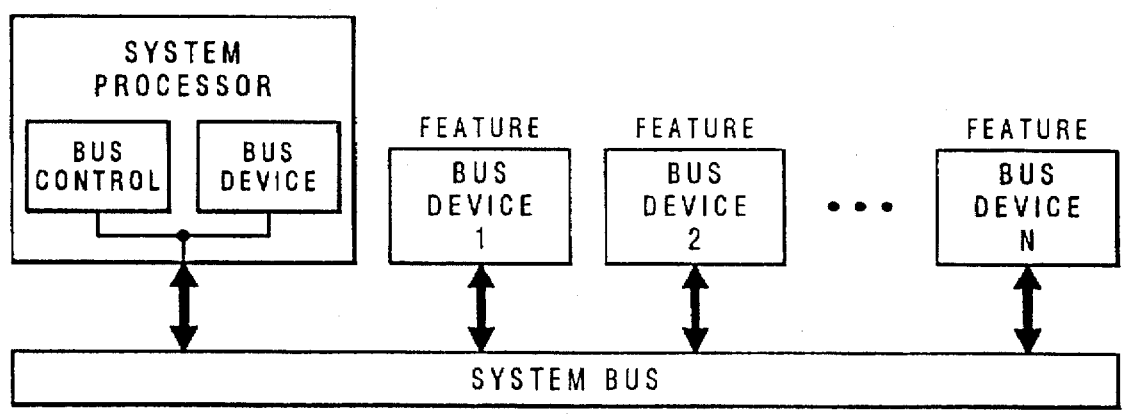
FIG. 1 depicts a high-level block diagram of a prior art data processing system having a system processor, a plurality of feature bus devices, and a system bus.
Figure 2:
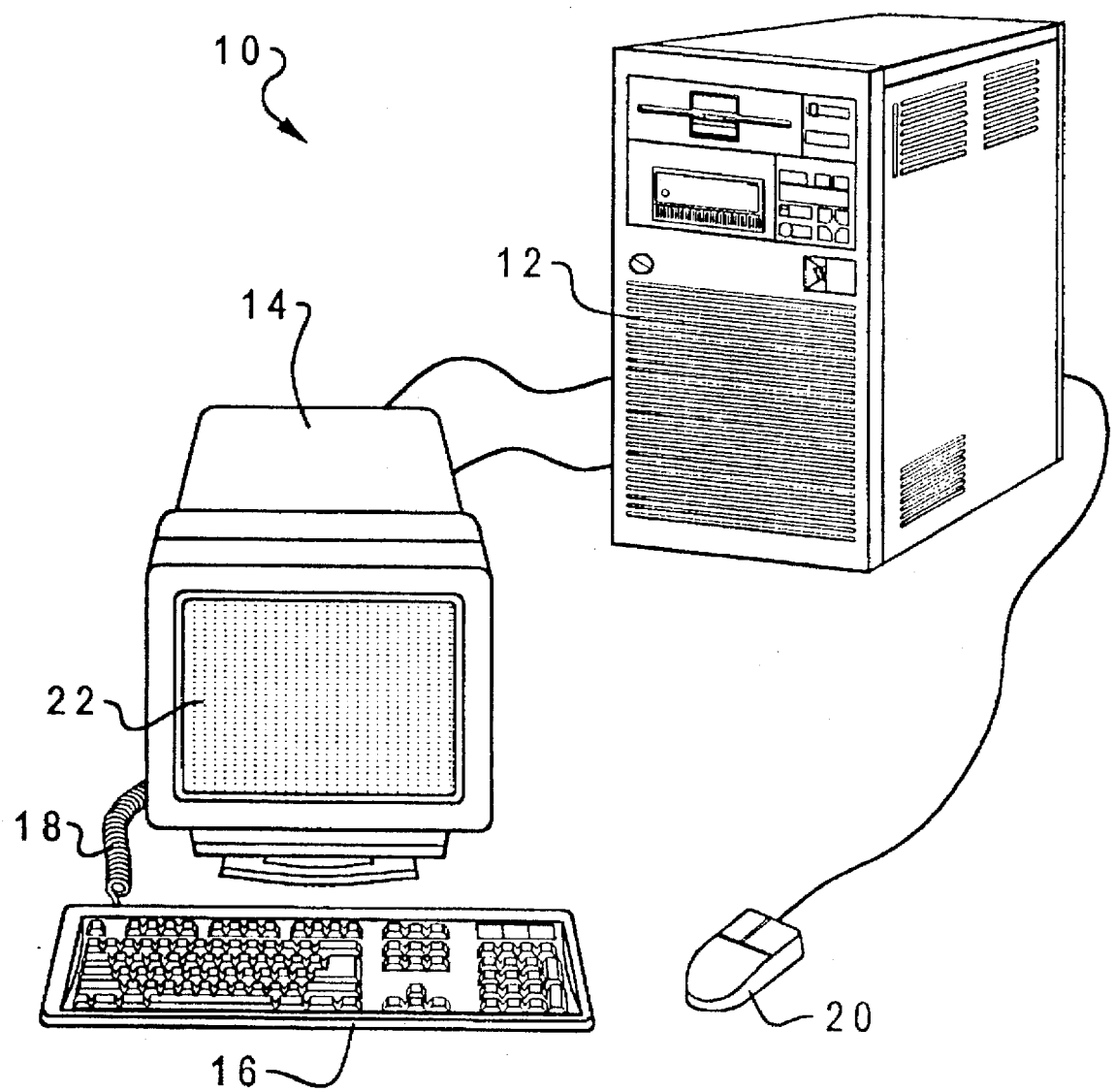
FIG. 2 depicts a data processing system in accordance with the method and system of the present invention.

With reference now to the figures, and in particular to FIG. 2, there is depicted a data processing system 10, which includes processor 12, display 14, and keyboard 16. Keyboard 16 is coupled to processor 12 by cable 18. Display 14 includes display screen 22, which may be implemented using various known display screen technologies. Data processing system 10 also includes pointing device 20, which may be implemented using a trackball, joystick, touch-sensitive tablet or screen, trackpad, or as illustrated in FIG. 2, a mouse. Pointing device 20 may be utilized to move a pointer or cursor on display screen 22. Processor 12 may also be coupled to one or more peripheral devices, such as a CD-ROM, or a network adapter, or a modem, each of which may be eternal or external to the enclosure processor 12. An output device such as a printer may also be coupled to processor 12.

Those persons skilled in the art of data processing system design should recognize that display 14, keyboard 16, and pointing device 20 may each be implemented utilizing any one of several known off-the-shelf components. Additionally, data processing 10 may be implemented by modifying in accordance with the present invention any general purpose computer or so-called personal computer that utilizes a backplane or motherboard to provide a system bus interconnection between system processor circuits and feature device circuits. An example of such a general purpose computer that may be modified according to the present invention is the computer sold under the trademark "RS/6000" by International Business Machines, Corporation (IBM) of Armonk, N.Y. An example of a personal computer that may be modified according to the present invention is the personal computer sold under the trademark "PS/2" by IBM. In other applications of the present invention, data processing system 10 may not include display 14, keyboard 16, or pointing device 20.

Figure 3:
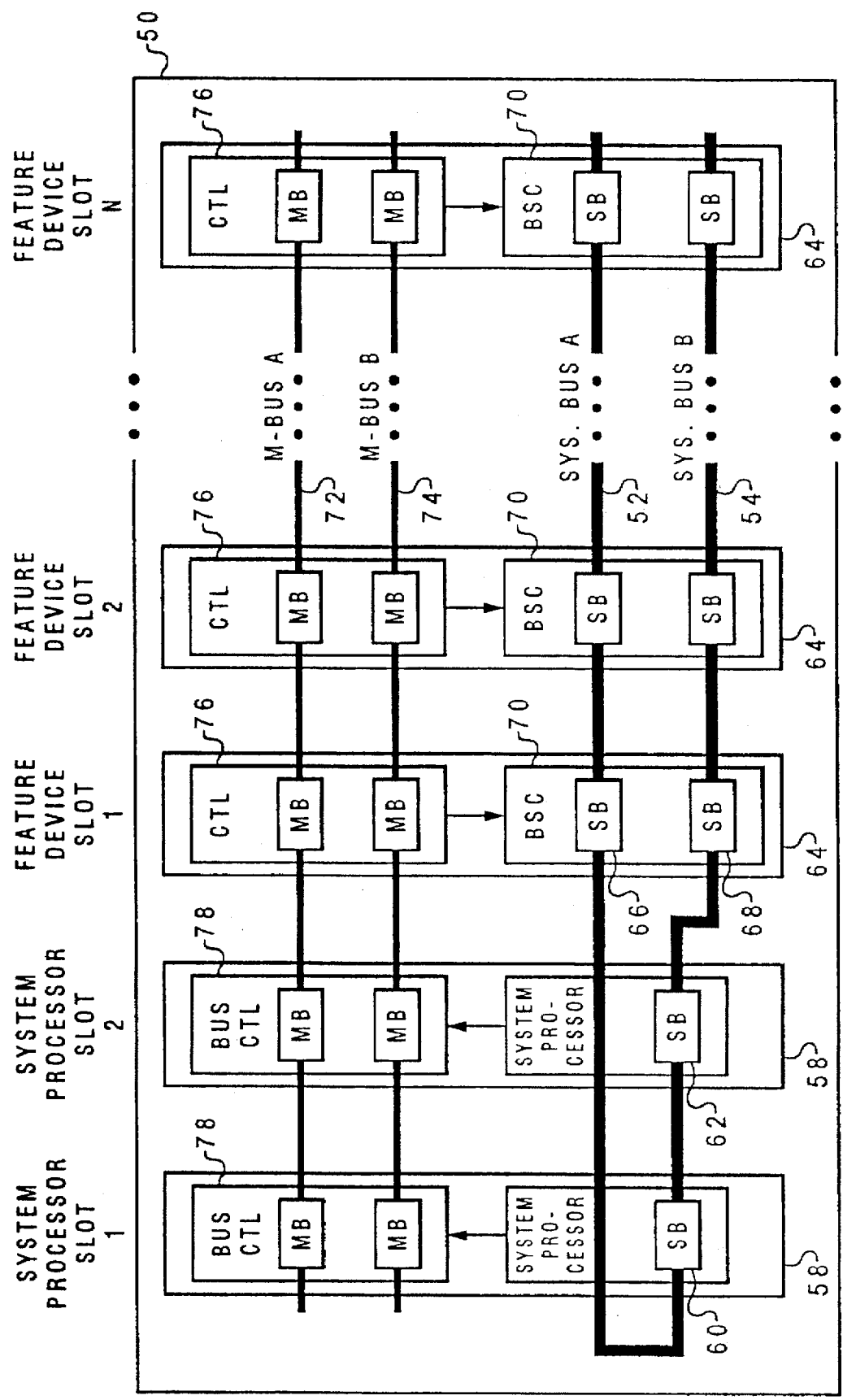
FIG. 3 is a high-level block diagram which further illustrates the major components of the data processing system of FIG. 2 in accordance with the method and system of the present invention.

With reference now to FIG. 3, there is depicted a high-level block diagram of a backplane having system processor slots and feature device slots in accordance with the method and system of the present invention. As illustrated, backplane 50 includes multiple system buses, which in this example are implemented by system bus A 52 and system bus B 54. Backplane 50 and system buses 52 and 54 may be fabricated according to any of various known circuit board manufacturing techniques. For example, one of the more common ways to fabricate a backplane is to photochemically etch copper conductors laminated to a fiberglass substrate.

Typically, system buses 52 and 54 include communication means—which are typically electrical conductors such as wires or traces on a printed circuit board—that carry data, address data for indicating where such data may be found or the destination of such data, and control signals for insuring that various parts of the system share the system bus without conflict. System buses may be characterized by the number of bits they can transfer at a single time. For example, a system bus may transfer 8-, 16-, 32-, or 64-bits at a time. Depending upon system requirements and other system constraints, the designer may select any number of bits to be transferred at a time on system buses 52 and 54.

Backplane 50 includes means for coupling the buses on the backplane to other circuits. These other circuits may be located in an area in data processing system 10 referred to as a "slot." Such a slot may be designed to receive a circuit board containing the additional circuitry. Typically, the circuit board and backplane 50 utilize connectors for connecting the circuits on the circuit board to system buses 52 and 54. As illustrated in FIG. 3, circuit boards plugged into the slots associated with backplane 50 could be divided into at least two classes—a system processor slot and a feature device slot.

In the example of FIG. 3, two system processor slots are shown, along with N number of feature device slots. A system processor, which may be plugged into a system processor slot, may be implemented by a circuit board containing a CPU which provides a base level function for data processing 10. Feature devices, which may be plugged to feature device slots in backplane 50, typically provide specialized functions that enable data processing 10 to perform assigned tasks in a particular application or configuration. For example, a feature device may include a RAID (Redundant Array of Inexpensive Disks) controller, or a communications/network interface. In FIG. 3, system processor 56 is installed in system processor slot 1 and system processor 58 is installed in system processor slot 2. System processor 56 is connected to system bus A 52 at system bus connection 60. Similarly system processor 58 is connected to system bus 54 at system bus connection 62. Note that system bus A 52 and system bus B 54 are not interconnected. Thus, a problem that affects system bus communications on system bus A 52 will most likely not affect system bus communications on system bus B 54. In an alternate embodiment of the present invention, system processor cards may be connected to both system buses, wherein the system bus used by the system processor card is selected by bus selection circuitry (similar to bus selection circuit 70 described below).

Feature devices 64, which are inserted into feature device slots 1 through N, also include system bus connections 66, which connect feature devices 64 to system bus A 52, and system bus connections 68 that connect feature devices 64 to system bus B 54. Because feature devices 64 are connected to both system buses 52 and 54, the feature devices may select either bus for communicating system processor communications between feature device 64 and either system processor 56 or 58. Such a system bus selection is provided by bus selection circuitry (BSC) 70, which is preferably part of each feature device 64. Bus selection circuitry 70 may be implemented with conventional solid-state switch-circuits, or conventional bus transceivers, or a combination of both. Bus selection circuitry 70 may alternatively be implemented on backplane 50. If bus selection circuit 70 is implemented on backplane 50, only one physical system bus connector is necessary at each feature device slot—the selected system bus is connected to feature device 64 through one connector. Locating bus selection circuit 70 on the backplane, however, has the drawbacks of increasing the manufacturing cost of the backplane and introducing a possible single point of failure at the single system bus connector.

In order to control the selection of system buses by bus selection circuitry 70, each feature device 64 and both system processors 56 and 58 are connected to at least one management bus, such as management bus A 72 and management bus B 74. On feature devices 64, control circuits 76 receive signals or commands from management buses 72 and 74. These received signals may be decoded to produce a signal that is sent to bus selection circuitry 70 for controlling the selection of either system bus A 52 or system bus B 54 to be used by the particular feature device 64 to communicate system processor communications. If more than one management bus is used on backplane 50, the management buses, such as buses 72 and 74, may each be used to communicate the same data, thus providing a redundant management bus. Management buses 72 and 74 may be implemented with a serial bus, such as the I²C-bus, which is a standard bus developed by Phillips, or a similar low-cost serial or parallel bus technology. Such a serial bus may be implemented with two conductors. Connections between management buses 72 and 74, and feature devices 64, are shown in control circuits 76 by the letters "MB."

Both system processors 56 and 58 are also coupled to management bus A 72 and management bus B 74. Communication between system processors 56 and 58 and management buses 72 and 74 is controlled by bus control circuitry 78 in each system processor. Therefore, if it is determined that a problem that affects system processor communications over system bus A 52 exists, system processor 56 or 58 may send data via management buses 72 and 74 from bus control circuitry 78 to control circuits 76 in feature device 64. Once received, such data is decoded and a signal is sent to bus selection circuitry 70 to cause the feature device 64 to switch from communicating on system bus A 52 to begin communicating system processor communications on system bus B 54.

Figure 4:
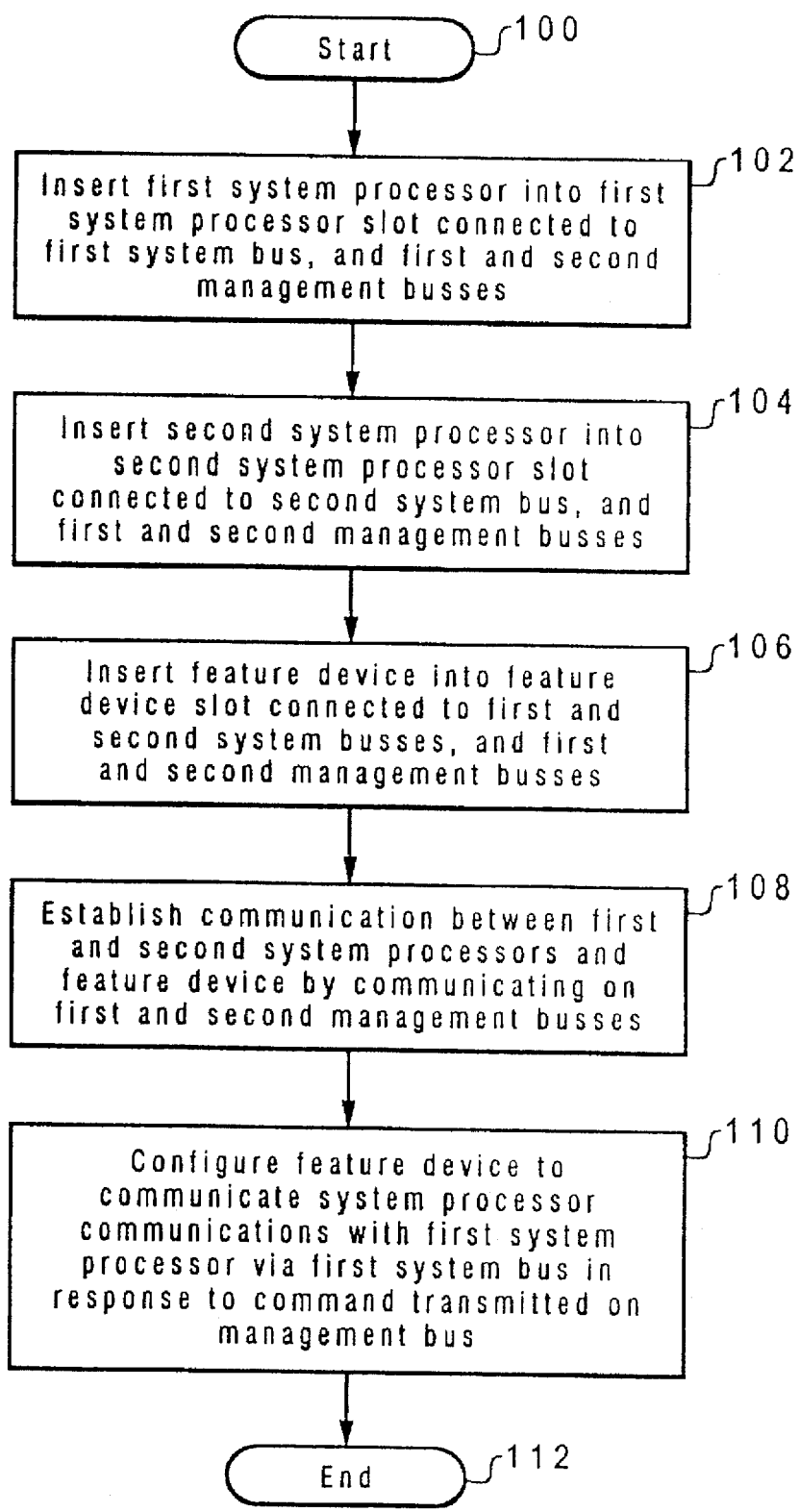
FIG. 4 is a high-level flowchart that illustrates the process of initializing the method and system of the present invention.

With reference now to FIG. 4, there is depicted the process of initializing a data processing system in accordance with the method and system of the present invention. As illustrated, the process begins at block 100 and thereafter passes to block 102 wherein a first system processor is inserted into a first system processor slot, thereby connecting it to a first system bus, and first and second management buses. Thereafter, a second system processor is inserted into a second system processor slot, which connects it to a second system bus, and the first and second management buses, as illustrated at block 104. Next, a feature device is inserted into a feature device slot and is thereby connected to the first and second system buses, and the first and second management buses, as depicted at block 106.

The system then establishes communication during powerup or reset between the first and second system processors and the feature device by communicating on the first and second management buses, as illustrated at block 108. Finally, in response to receiving a command transmitted on the first and second management buses, the feature device is configured to communicate system processor communications with the first system processor via the first system bus, as depicted at block 110. Once initialization is complete, the initialization procedure terminates as illustrated at block 120.

Although two management buses are described in the example illustrated in FIG. 4, only one management bus is needed. More than one management bus is used to provide management bus redundancy.

Note that the longitudinal spacing between system bus connectors 60 and 62 and the management bus connections on system processor 58 is different than the longitudinal spacing between the management bus connections and system bus connectors 66 and 68 on feature device 64. This difference in connector spacing prevents plugging system processors into feature device slots and plugging feature devices into system processor slots. This connector configuration illustrates one example of a means for inhibiting the connection of a feature device in a system processor slot, or the connection of two system processors on the same system bus. If a feature device could erroneously be plugged into a system processor slot, data processing system 10 may be left with only one system processor, which means that the system is not operating in a redundant mode. Other means for inhibiting installation of cards in the wrong slot include using a "keyed" connector having extra pins or places where pins have been removed so that connectors or circuit cards will not mate with a different type of connector on the backplane.

The initialization procedure depicted in FIG. 4 may also include steps for initializing more than one feature device, wherein some feature devices may be configured to communicate system processor communications with the first system processor via the first system bus, while other feature devices may be initially configured to communicate system processor communications with a second system processor via a second system bus, thus dividing system processing work, and the work of communicating system processor communications, between the two system processors and the two system buses in the data processing system. Such division of work increases data processing system efficiency by maximizing the use of all resources in data processing system 20.

Figure 5:
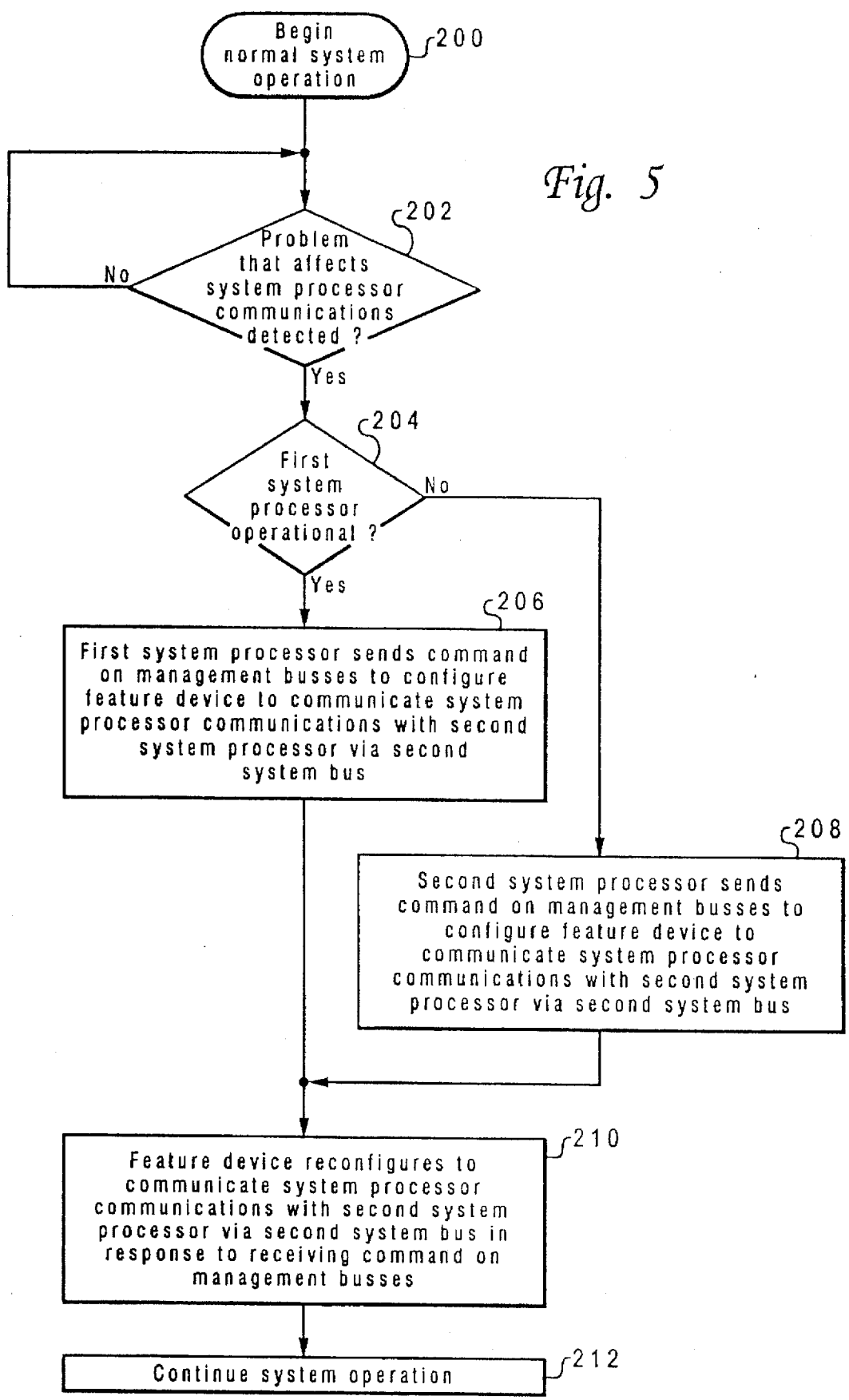
FIG. 5 is a high-level flowchart that illustrates normal system operation and system response to the detection of a problem affecting system bus communication in accordance with the method and system of the present invention.

With reference now to FIG. 5, there is depicted a high-level flowchart of normal data processing system operation and system response to the detection of a problem in accordance with the method and system of the present invention. As illustrated, the process begins at block 200 and thereafter passes to block 202 wherein the process determines whether or not a problem that affects system processor communications on the first system bus has been detected. If such a problem has not been detected, the data processing system continues normal operation utilizing the first bus to transfer system processor communications, as illustrated by the "NO" branch from block 202.

If, however, a problem that affects system processor communications on the first bus has been detected, the process then determines whether or not the first system processor is in an operational condition, as illustrated at block 204. If the first system processor is operational, the first system processor sends a command on the first and second management buses to configure the feature device so that it communicates system processor communications with the second system processor via the second system bus, as depicted at block 206. However, if the first system processor is not operational, the second system processor sends a command on the first and second management buses to configure the feature device so that it communicates system processor communications with the second system processor via the second system bus, as illustrated at block 208.

Methods for detecting a problem that affects system processor communications on a system bus include:

Monitoring the output of a watchdog timer circuit located on the system processor cards;

Monitoring parity bits for data transferred on the system bus;

Detecting a time-out condition or a slow response to communications sent over the system bus;

Detecting garbled or nonsensical responses to commands that were sent over the system bus;

Failure to successfully arbitrate access to the bus, which may result in an arbitration time-out.

After receiving the command via the management buses, the feature device reconfigures to communicate system processor communications with the second system processor via the second system bus in response to receiving the command on management buses A and B, as depicted at block 210. System operation continues, as illustrated at block 212, even though a problem that affects system processor communications on the first system bus has been detected, thus increasing the reliability of the data processing system.

In another embodiment, the invention described above may include more than two system processors. The more-than-two system processors may or may not each have their own system buses. The number of system processors utilized will be determined by the practical limits of technology and the benefits derived from having more than two system processors. Such benefits may include greater fault tolerance or greater ability to share communication and computation loads. Other embodiments of the present invention may include a system processor card that has a switched (e.g., multiplexed) access to each system bus via a bus selection function similar to that performed by the bus selection circuitry 70 on each feature device 64. If each system processor can use both system buses, means for preventing bus contention must also be included in the data processing system.

Figure 6:
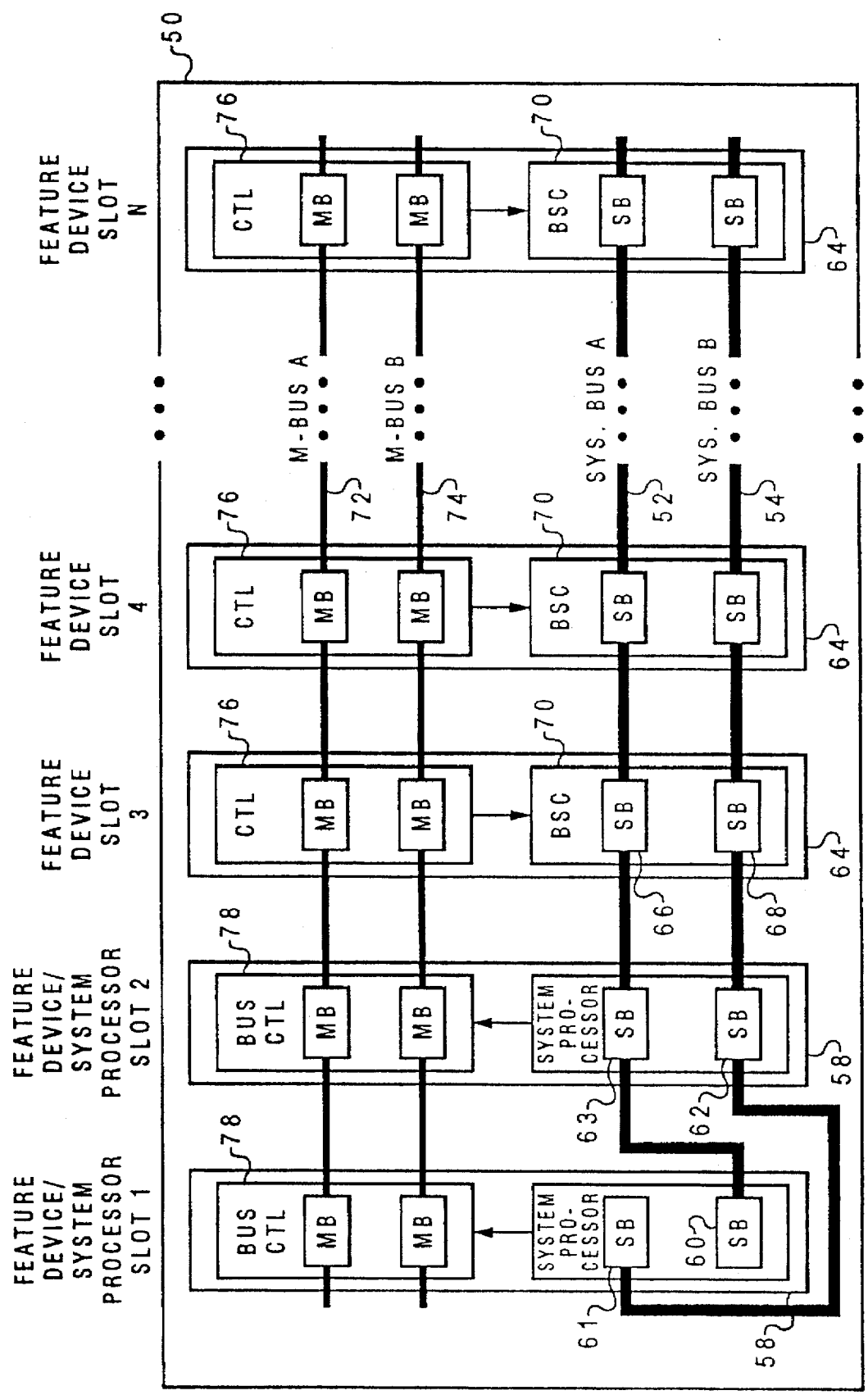
FIG. 6 is a high-level block diagram that illustrates an alternate embodiment of the method and system of the present invention.

Other embodiments may also provide a backplane with connectors configured in such a way that either a feature device or a system processor may be plugged into either a feature device slot or a system processor slot, without precluding the redundancy provided by the invention described above. FIG. 6 shows how this may be implemented. Of course, such a data processing system with "universal slots" would still require two system processors plugged into any two slots in order to have complete redundancy. In a "universal slot" system, system processors would be connected to more than one system bus, and would therefore require bus selection circuits to select a system bus. A "universal slot" system permits all slots but one to be filled with feature devices that work with one system processor. Thus, system processor redundancy may be given up in exchange for an additional feature device slot.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

What is claimed is:

1. A method for increasing the performance and reliability of a data processing system, said method comprising the steps of:

coupling a first system processor to a first system bus, wherein said first system processor includes a first bus controller;

coupling a second system processor to a second system bus, wherein said second system processor includes a second bus controller;

coupling said first bus controller to a management bus;

coupling said second bus controller to said management bus;

coupling at least one feature device to said first system bus, said second system bus, and said management bus, wherein said at least one feature device is configured to communicate system processor communications with said first system processor via said first system bus;

detecting a problem that affects system processor communications over said first system bus between said at least one feature device and said first system processor;

sending a command on said management bus to said at least one feature device; and in response to receiving said command from said management bus, configuring said at least one feature device to communicate system processor communications with said second system processor via said second system bus, wherein said data processing system including said at least one feature device continues to operate as a result of communicating system processor communications with said second system processor via said second system bus in the presence of a problem that affects system processor communications over said first system bus.

2. The method according to claim 1 further including:

coupling said first bus controller to a second management bus;

coupling said second bus controller to said second management bus; and coupling said at least one feature device to said second management bus.

3. The method according to claim 2 further including the step of configuring said at least one feature device to communicate system processor communications with said second system processor via said second system bus in response to receiving said command via said second management bus.

4. The method according to claim 2 wherein the step of sending a command on said management bus to said at least one feature device includes the step of sending a command on said first and second management buses to said at least one feature device.

5. The method according to claim 1 wherein the step of detecting a problem that affects system processor communications over said first system bus between said at least one feature device and said first system processor includes detecting a problem in said first system processor that affects system processor communications over said first system bus between said at least one feature device and said first system processor.

6. The method according to claim 1 wherein data transferred via said first system bus includes parity data, and wherein the step of detecting a problem that affects system processor communications over said first system bus between said at least one feature device and said first system processor includes detecting a parity error in data on said first system bus.

7. A system for increasing the performance and reliability of a data processing system comprising:

means for coupling a first system processor to a first system bus, wherein said first system processor includes a first bus controller;

means for coupling a second system processor to a second system bus, wherein said second system processor includes a second bus controller;

means for coupling said first bus controller to a management bus;

means for coupling said second bus controller to said management bus;

means for coupling at least one feature device to said first system bus, said second system bus, and said management bus, wherein said at least one feature device is configured to communicate system processor communications with said first system processor via said first system bus;

means for detecting a problem that affects system processor communications over said first system bus between said at least one feature device and said first system processor;

means for sending a command on said management bus to said at least one feature device; and means for configuring said at least one feature device to communicate system processor communications with said second system processor via said second system bus in response to receiving said command from said management bus, wherein said data processing system including said at least one feature device continues to operate as a result of communicating system processor communications with said second system processor via said second system bus in the presence of a problem that affects system processor communications over said first system bus.

8. The system according to claim 7 further including:

means for coupling said first bus controller to a second management bus;

means for coupling said second bus controller to said second management bus; and means for coupling said at least one feature device to said second management bus.

9. The system according to claim 8 further including means for configuring said at least one feature device to communicate system processor communications with said second system processor via said second system bus in response to receiving said command via said second management bus.

10. The system according to claim 8 wherein said means for sending a command on said management bus to said at least one feature device includes means for sending a command on said first and second management buses to said at least one feature device.

11. The system according to claim 7 wherein said means for detecting a problem that affects system processor communications over said first system bus between said at least one feature device and said first system processor includes means for detecting a problem in said first system processor that affects system processor communications over said first system bus between said at least one feature device and said first system processor.

12. The system according to claim 7 wherein data transferred via said first system bus includes parity data, and wherein said means for detecting a problem that affects system processor communications over said first system bus between said at least one feature device and said first system processor includes means for detecting a parity error in data on said first system bus.

13. A backplane for increasing the performance and reliability of a data processing system comprising:

a first system bus adapted to couple to a first system processor and to at least one feature device, said first system bus for communicating system processor communications between said first system processor and said at least one feature device;

a second system bus adapted to couple to a second system processor and to said at least one feature device, said second system bus for communicating system processor communications between said second system processor and said at least one feature device; and a management bus adapted to couple to a first system processor, a second system processor, and said at least one feature device.

14. The backplane according to claim 13 further including a second management bus adapted to couple to said first system processor, said second system processor, and said at least one feature device.

15. The backplane according to claim 13 wherein a number of conductors in said management bus is equal to two.

16. The backplane according to claim 13 wherein said first and second system buses include connectors adapted to couple to said first system processor or said second system processor, and to inhibit coupling to said at least one feature device.

17. The backplane according to claim 16 wherein said backplane includes a plurality of system processor slots and at least one feature device slot, wherein said plurality of system processor slots each include:

a management bus connector adapted to couple either said first system processor or said second system processor to said management bus; and a system bus connector adapted to couple said first system processor to said first system bus or said second system processor to said second system bus, wherein said management bus connector is spaced apart from said system bus connector by a first distance;

and wherein said at least one feature device slot includes:

a management bus connector adapted to couple said at least one feature device to said management bus; and first and second system bus connectors adapted to couple said at least one feature device to said first and second system buses, wherein said management bus connector is spaced apart from either of said first or second system bus connectors by a distance different from said first distance to inhibit connection of said first or second system processors in said at least one feature device slot and to inhibit connection of said at least one feature device in said plurality of system processor slots.

18. The backplane of claim 13, said backplane further including:

a plurality of system processor slots that are each adapted to couple either said first system processor or said second system processor to said management bus and at least one of said first system bus and said second system bus, each of said plurality of system processor slots coupling only a single one of said first system processor and said second system processor at a time; and at least one feature device slot adapted to couple said at least one feature device to said management bus and to said first and second system buses.

19. The backplane of claim 13, wherein said management bus communicates control signals between first and said second system processors and said at least one feature device.

20. The backplane of claim 13, wherein:

said first system bus is further adapted to couple to said second system processor; and said second system bus is further adapted to couple to said first system processor.

* * * * *